Patented Dec. 21, 1937

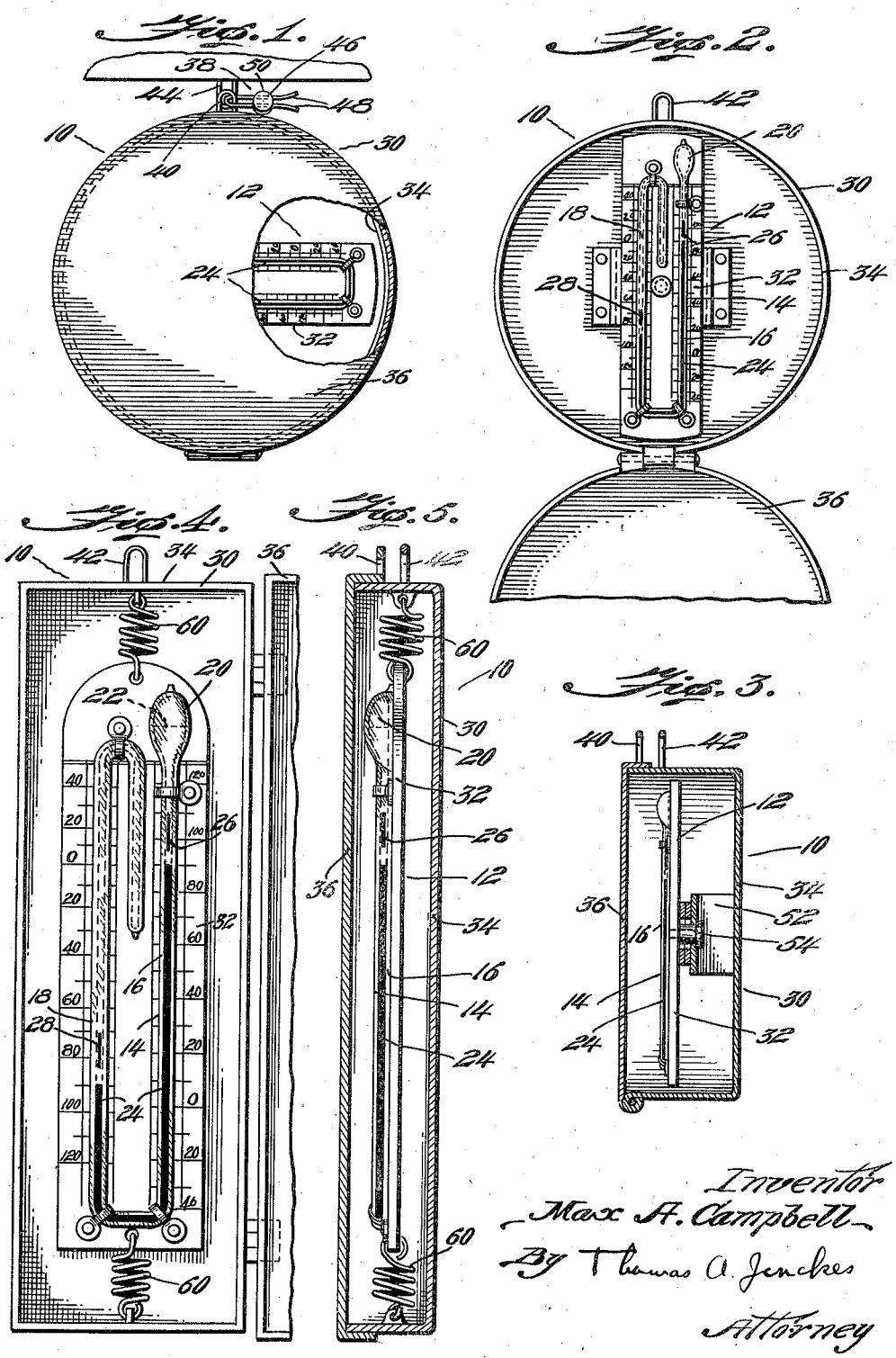

2,102,678

UNITED STATES PATENT OFFICE 2,102,678

SEALED TAMPERPROOF MAXIMUM AND MINIMUM THERMOMETER FOR USE PARTICULARLY IN BROODING OF CHICKS

Max A. Campbell, East Providence, R. I.

Application February 12, 1937, Serial No. 125,472

7 Claims. (Cl. 73—374)

My invention relates to improvements in sealed tamper-proof maximum and minimum thermometers for use particularly in the brooding of chicks. It has been customary for sellers of chicks to guarantee the life of the chicks for a period of over two or three weeks. This has involved considerable risk as all types of wood, coal or electric brooders are now used and they may not be operated intelligently, so as to permit the temperature to rise above the temperature safe for chick brooding or to permit it to fall below the temperature safe for chick brooding.

An object of my invention is to provide a positively tamper-proof maximum and minimum thermometer which may be loaned to the purchaser for this period of over two or three weeks, so that the seller may check up the maximum and minimum readings with assurance that they will not be tampered with and for this purpose I have provided for any type of maximum or minimum thermometer a casing forming a magnetic screen to prevent exterior magnetic tampering with the maximum and minimum indicating means therein which may be preferably sealed with the thermometer encased therein during this period and which may be opened up to permit the thermometer to be inspected by the seller at the end of the guarantee period.

Further objects of my invention are to provide supplemental precautions in a tamper-proof maximum and minimum thermometer for preventing external manipulation of the indicating means thereof. It is supplementally known that the magnetic indicators in maximum and minimum thermometers may be knocked out of their true registering maximum and minimum positions by forcibly tapping the end of the thermometer and so in one embodiment of my invention I movably mount said thermometer within the casing so that the tamperer will not know where to tap and the chances of his successful tapping are reduced to a minimum and in another embodiment of my invention I resiliently mount said thermometer within the casing so that no tapping thereof may cause the maximum and minimum indicating means to move.

A further object of my invention is to provide a novel type of tamper-proof maximum and minimum thermometer adapted for any use in transportation or otherwise.

These and such other objects of my invention as may hereinafter appear will be best understood from a description of the accompanying drawing which illustrates embodiments thereof.

In the drawing, Fig. 1 is a front elevation of one embodiment of my invention employing a maximum and minimum thermometer rotatably mounted within a sealed casing forming a magnetic screen, a portion of the casing being broken away to show the thermometer and showing the casing cover in closed sealed position.

Fig. 2 is a front elevation of the embodiment of my invention shown in Fig. 1 with the cover pivoted to open position and the thermometer rotated to a vertical position.

Fig. 3 is a vertical sectional view taken through the embodiment of my invention shown in Fig. 1 with the thermometer rotated to a vertical position and shown in elevation.

Fig. 4 is a front elevation of a different embodiment of my invention employing a casing constructed of material forming a similar magnetic screen with the ends of the thermometer resiliently mounted within the casing.

Fig. 5 is a vertical sectional view of the embodiment of my invention shown in Fig. 4, also showing the thermometer in elevation.

In the drawing, wherein like characters of reference indicate like parts throughout, 10 generally indicates my invention, which as stated hitherto, includes a maximum and minimum thermometer 12. While any type of maximum and minimum thermometer may be employed, most usual types include a U-shaped vacuum tube 14 having the maximum limb 16 and the minimum limb 18 with a heat expansion bulb 20 for the expansive thermometric liquid 22 which controls in the usual manner the height of the indicating thermometric liquid 24 in each limb. While the respective maximum and minimum limbs 16 and 18 are usually connected as shown, it is obvious that the limbs need not be so connected or connected in other forms as in other types of such thermometers. As is usual in devices of this description each of the respective maximum and minimum limbs 16 and 18 carries a suitable indicating means 26 and 28 usually comprising slugs of a magnetizable metal, such as steel or iron, which are so light that they may be carried to respective maximum and minimum indicating positions. These indicating means 26 and 28 normally ride on the surface of the thermometric indicating liquid 24 to be moved to their respective maximum and minimum positions thereby and when the period for which the respective maximum and minimum readings are desired has expired, these indicating means 26 and 28 have been movable back to positions floating on said thermometric indicating liquid by an externally applied magnet.

A feature of my invention is to enclose a maximum and minimum thermometer within a casing constructed of a material capable of forming a magnetic screen to positively prevent movement of said indicating means by a magnet applied externally of said casing 30. The thermometer 12 may be removably contained within the casing 30 in any suitable manner, but in each embodiment of the invention shown, I provide a casing 30 having a body 34 and a removable cover 36 hingedly secured thereto and means 38 to seal the cover 36 in closed position to the body 34, or broadly speaking, means 38 to seal the casing when completely enclosing the thermometer. If the casing 32, including its body 34 and cover 36, where employed, be constructed of a magnetic material, such as cast iron or steel, it will of itself form a magnetic casing screen to positively prevent movement of said indicating means by a magnet applied externally of said casing. In other words, the casing is made so magnetic as to positively prevent the application of external magnetism from moving the indicating means 26 or 28.

As stated means 38 are provided to seal the casing when completely enclosing the thermometer, namely, the means 38 to seal the cover 36 to the body 34 when in closed position, in the embodiment shown said means comprising an eye 40 on the cover, an eye 42 on the body, a mounting eye 44 and a soft metal seal 46 comprising a piece of wire 48 which may be passed through the respective eyes 40, 42, and 44 and through suitable holes in a compressible soft metal disk 50 which may be compressed to bind the ends of the wire therein, of any standard type, such as is employed in freight car seals, or meter seals.

As stated hitherto, another fault with maximum and minimum thermometers has been that the indicating means 26 and 28 may be moved within the tube 14 by tapping on the ends of the thermometer and my invention further relates to an improved type of means to prevent such movement which I believe are novel, whether or not the casing of itself be constructed of a material forming a magnetic screen or otherwise. For this purpose, in the embodiment shown in Figs. 1–3, I rotatably mount the thermometer 32 on a suitable standard 52 on the casing body 34 by means of the pivot pin 54. Thus if the casing 30, shown in Figs. 1–3 be tapped in just the right position the indicating means may be moved but just the right position comprises a very small percentage of the periphery of the cylindrical casing so that the chances of the indicating means being moved by tapping are reduced to a minimum.

An alternative type of means for preventing tapping on the ends of the thermometer from moving the indicating means 26 and 28 is shown in the embodiment shown in Figs. 4–5, in which means 60 are provided to resiliently mount said thermometer within the casing 30 to prevent movement of said indicating means on tapping said casing, in the preferred embodiment said means comprising helical springs 60 interposed between and if desired as shown, positively connecting the ends of said thermometer 32 and the casing end walls.

It is thus apparent that I have provided a substantially tamper-proof maximum and minimum thermometer, not only proof against external tapping manipulation, but also if desired, proof against external magnetic manipulation, particularly adapted in the manner previously explained, for use in the brooding of chicks.

It is understood that my invention is not limited to the specific embodiments shown and that various deviations may be made therefrom without departing from the spirit and scope of the appended claims.

What I claim is:

1. As a new article of manufacture, a maximum and minimum thermometer having vacuum tube means having maximum and minimum limbs and containing thermometric indicating liquid means and magnetizable indicator means carried by the thermometric indicating liquid means in each limb to the respective maximum and minimum positions therein movable back to positions floating on said thermometric indicating liquid means by an externally applied magnet, a casing for removably enclosing said thermometer constructed of magnetic material to provide a magnetic casing screen to positively prevent movement of said indicator means by a magnet applied externally of said casing, means to seal the casing when completely enclosing the thermometer and means to movably mount said thermometer within the casing.

2. As a new article of manufacture, a maximum and minimum thermometer having vacuum tube means having maximum and minimum limbs and containing thermometric indicating liquid means and magnetizable indicator means carried by the thermometric indicating liquid means in each limb to the respective maximum and minimum positions therein movable back to positions floating on said thermometric indicating liquid means by an externally applied magnet, a casing for removably enclosing said thermometer constructed of magnetic material to provide a magnetic casing screen to positively prevent movement of said indicator means by a magnet applied externally of said casing, means to seal the casing when completely enclosing the thermometer and means to rotatably mount said thermometer within the casing.

3. As a new article of manufacture, a maximum and minimum thermometer having vacuum tube means having maximum and minimum limbs and containing thermometric indicating liquid means and magnetizable indicator means carried by the thermometric indicating liquid means in each limb to the respective maximum and minimum positions therein movable back to positions floating on said thermometric indicating liquid means by an externally applied magnet, a casing removably enclosing said thermometer constructed of magnetic material to provide a magnetic casing screen to positively prevent movement of said indicator means by a magnet applied externally of said casing, means to seal the casing when completely enclosing the thermometer and means to resiliently mount said thermometer within said casing to prevent movement of said indicator means on tapping of said casing, comprising a helical spring interposed between each end of said thermometer and each casing end wall.

4. As a new article of manufacture, a maximum and minimum thermometer having vacuum tube means having maximum and minimum limbs and containing thermometric indicating liquid means and magnetizable indicator means carried by the thermometric indicating liquid means in each limb to the respective maximum and minimum positions therein movable back to positions floating on said thermometric indicating liquid means by an externally applied magnet, a casing removably enclosing said thermometer constructed of magnetic material to provide a magnetic casing screen to positively prevent movement of said indicator means by a magnet applied externally of said casing, means to seal the casing when completely enclosing the thermometer and means to resiliently mount said thermometer within said casing to prevent movement of said indicator means on tapping of said casing.

5. As a new article of manufacture, a maximum and minimum thermometer having vacuum tube means having maximum and minimum limbs and containing thermometric indicating liquid means and magnetizable indicator means carried by the thermometric indicating liquid means in each limb to the respective maximum and minimum positions therein movable back to positions floating on said thermometric indicating liquid means, a casing removably enclosing said thermometer, means to seal the casing when completely enclosing the thermometer and means to rotatably mount said thermometer within the casing.

6. As a new article of manufacture, a maximum and minimum thermometer having vacuum tube means having maximum and minimum limbs and containing thermometric indicating liquid means and magnetizable indicator means carried by the thermometric indicating liquid means in each limb to the respective maximum and minimum positions therein movable back to positions floating on said thermometric indicating liquid means, a casing removably enclosing said thermometer, means to seal the casing when completely enclosing the thermometer and means to resiliently mount said thermometer within said casing to prevent movement of said indicator means on tapping of said casing, comprising a helical spring interposed between each end of said thermometer and each casing end wall.

7. As a new article of manufacture, a maximum and minimum thermometer having vacuum tube means having maximum and minimum limbs and containing thermometric indicating liquid means and magnetizable indicator means carried by the thermometric indicating liquid means in each limb to the respective maximum and minimum positions therein movable back to positions floating on said thermometric indicating liquid means, a casing for removably enclosing said thermometer, means to seal the casing when completely enclosing the thermometer and means to resiliently mount said thermometer within said casing to prevent movement of said indicator means on tapping of said casing.

MAX A. CAMPBELL.